3,185,624
PREPARATION OF PURIFIED LIPID A FROM CRUDE LIPID A DERIVED FROM LIPOPOLY-SACCHARIDES OF GRAM-NEGATIVE BACTERIA
Masao Nakazawa, Nakanoku, Tokyo, Japan, assignor to Taisho Pharmaceutical Co., Ltd., Tokyo, Japan
No Drawing. Filed Mar. 14, 1963, Ser. No. 265,044
Claims priority, application Japan, Mar. 26, 1962, 37/11,085
5 Claims. (Cl. 167—78)

This invention relates to the preparation of the purified lipid A derived from gram-negative bacteria, particularly Enterobacteriaceae, by the following procedure:

The crude lipopolysaccharides extracted from the cultured bacterial cells with aqueous phenol are hydrolyzed with dilute hydrochloric acid and extracted with chloroform. The crude lipid A fractions isolated from the hydrolyzates as chloroform-soluble substance are fractionated on a silicic acid column using the solvent system: chloroform-methanol. From the main fraction, containing purified lipid A, most of the solvents are distilled off and to the concentrated solution of the purified lipid A, acetone is added. The flocculent precipitates of the purified lipid A are collected by centrifugation and dried in vacuo.

Lipid A is a substance which is being watched with keen interest in view of the fact that it elicits characteristic reactions such as antitumor effect against animal tumors, stimulation of resistance to experimental infections, enhancement of antibody production as adjuvant, and alteration of reactivity to epinephrine.

On the preparation of the purified lipid A, a process is described in German Pat. No. 1,073,150 (D.B.P.). In this process, the crude lipid A is first extracted with fatty acid ester and then the insoluble residue is dissolved in solvents such as aromatic tertiary or secondary amine or tetrahydrofurane. Further, to this solution an excess of lower aliphatic alcohol is added, the resulting precipitates being then separated by centrifugation. The supernatant solution is concentrated to a small volume in vacuo and the final concentrated solution is diluted with water and dried from the frozen state.

In the present invention, the crude lipopolysaccharide is hydrolyzed for half an hour in 1 N HCl containing 1 percent by weight of sodium chloride, at 100° C. and the hydrolyzates are extracted with chloroform. To the chloroform extracts, after washing with water, are added 5 to 10 volumes of acetone, the resulting precipitates are repeatedly washed with acetone and dried in vacuo. The crude lipid A thus obtained is used as starting material for further purification.

The results of chromatographic analyses carried out using thin-layer chromatography indicate that the crude lipid A fraction is not necessarily homogeneous. A primary object of the present invention, therefore, is the improvement of the chromatographic procedure for the purpose of assuring a yield of purified lipid A. This object is realized, according to the invention by the following specific combination: use of silicic acid as the adsorbent and use of chloroform-methanol mixture (6:4 by volume) as eluent. Optimum chromatographic resolution and separation of impurities such as free fatty acids, amino acids and proteins, are thus assured.

The yields of the purified lipid A by the procedure of this invention are about 60–70 percent by weight, which are better than those in the precedingly-described known method.

Properties of the purified lipid A obtained by the procedure according to this invention:

(1) PHYSICOCHEMICAL PROPERTIES

The purified lipid A fractions are white powder, insoluble in water, acetone, ethanol and methanol, soluble in ether and petroleum ether and readily soluble in chloroform and pyridine. These fractions melt at about 175–180° C. with decomposition.

Results of chemical analysis are as follows (percentages being by weight): N, 1.9—2.1%; P, 2.1—2.5%; glucosamines, 17—20%; fatty acids, 60—70%; lauric acid, myristic acid, palmitic acid and unidentified acid constituting the remainder.

The infrared absorption pattern of the purified lipid A is characterized by absorption peaks at the following frequencies expressed in reciprocal centimeters: 1730, 1655 and 1550, which indicate ester C=O stretching, —CO—NH— and N—H deformation, respectively.

(2) BIOLOGICAL PROPERTIES

The lethal toxicity ($LD_{50}$) intravenously in mice and the pyrogenicity (minimal dose required to produce a 0.6 C. rise in body temperature) in rabbits of the aqueous colloids of the purified lipid A are 250 mg./kg. and 2–5 µg./kg., respectively. In contrast the $LD_{50}$ in mice and the pyrogenicity in rabbits of the lipid A described in German Pat. No. 1,073,150 are approximately 50 mg./kg. and 0.02 µg./kg., respectively. It is therefore apparent that the toxicity and pyrogenicity of the purified lipid A have diminished considerably as compared with those of the lipid A described in the said patent.

The following examples set forth presently preferred illustrative embodiments of the invention. Parts by volume bear the same relationship to parts by weight as do milliliters to grams. Percentages are by weight.

*Example 1*

An about 5 percent aqueous suspension of bacterial cells of *E. coli* is extracted with an equal volume of 90 percent phenol at 65–70° C. and the mixture is centrifuged at 10,000 r.p.m. for 15 minutes. The aqueous extracts are chilled and treated with 5 volumes of cold acetone. The flocculent precipitates collected by centrifugation are dissolved in water and dialyzed against running water for 3 days. To each 125 parts by volume of the dialyzed solution, containing about 3 percent of the crude lipopolysaccharide, and equal volume of 2 N HCl containing 2 percent of sodium chloride is added and the mixture is heated in a sealed tube on a boiling water bath for 30 minutes. The hydrolyzate is cooled and extracted with chloroform. To the chloroform extracts, after washing with water, there are added 5 volumes of cold acetone. The flocculent precipitates are collected, repeatedly washed with acetone and dried in vacuo. This material is designated as the crude lipid A.

The yield of the crude lipid A derived from 2500 parts by weight of moist cells is approximately 3.1 parts by weight.

The mixed powder of 60 parts by weight of silicic acid (Mallinckrodt, 100 mesh, suitable for chromatographic analysis) and 30 parts by weight of diatomaceous silica (Hyflo Super-Cel), dried at 100° C. for an hour, is suspended after washing with distilled water and then methanol, in chloroform and the thin slurry is then poured into a chromatographic tube. One part by weight of the crude lipid A fraction dissolved in 60 parts by volume of chloroform is introduced at the top of the column and allowed to drain down slowly. After eluting with 500 parts by volume of chloroform, the purified lipid A fraction is eluted with 1000 parts by volume of 40 percent methanol containing chloroform. The eluted solution is concentrated to a small volume in vacuo and treated with 10 volumes of cold acetone. The resulting precipitates are collected by centrifugation and dried in vacuo.

The yield of the purified lipid A is 0.722 part by weight. It melts at 175–180° C.

*Example 2*

1.2 parts by weight of the crude lipid A fractions are dissolved in 80 parts by volume of chloroform, the resulting solution is poured into a silicic acid chromatography column. After the column is first washed with 500 parts by volume of chloroform, the purified lipid A fractions are eluted with 1000 parts by volume of 40 percent methanol containing chloroform in the same manner as described in Example 1.

The eluted solutions are concentrated to a small volume in vacuo and to the concentrated solution there are added 15 volumes of cold acetone and allowed to cool in a refrigerator for one night.

The fluocculent precipitates are collected by centrifugation, washed with acetone and dried in vacuo.

The yield of purified lipid A is 0.840 part by weight.

The purified lipid A obtained in the process of the invention, as described supra, shows a definite inhibitory effect against experimental mice tumors, signs of secondary effect being scarcely seen. The purified lipid A also enhances resistance to infection, and enhances antibody production.

The new product of this invention is useful in enhancing resistance to microbial infectious disease, particularly gram negative bacterial infectious disease, such as those due to pathogenic *E. coli, Pseudomonas aeruginosa, Salmonella enterititis* and so on, e.g., epidemic diarrhea, scours in calves, etc.

The lipid A can be derived from the culture of an enterobacteria, such as *E. coli*. Strains of the latter which may be used in the foregoing illustrative examples comprise, e.g. *E. coli communis* No. 602 and *E. coli communior* No. 30.

What is claimed is:

1. A process of preparing purified lipid A from the lipopolysaccharides derived from gram-negative bacteria by phenol extraction and acid hydrolysis of the so-obtained extract, which comprises dissolving crude lipid A in chloroform, fractionating the resulting crude lipid A fractions on a silicic acid column by means of chloroform-methanol (6:4) eluant, distilling off the solvents from the thus-obtained fractions, adding acetone to the resultant concentrated solution of purified lipid A, collecting the flocculent precipitates by centrifugation, and drying in vacuo.

2. A process according to claim 1 wherein the gram-negative bacteria are Enterobacteriaceae.

3. A process according to claim 2 wherein the Enterobacteriaceae is *Escherichia coli*.

4. In a process for purifying crude lipid A fractions by means of chromatography on an adsorbent column, followed by elution with an eluant, the improvement wherein the adsorbent is a mixture of silicic acid and diatomaceous silica and eluant is a mixture of about 6 parts by volume of chloroform and about 4 parts by volume of methanol.

5. A process according to claim 4 wherein the weight ratio of silicic acid to diatomaceous silica is about 2 to 1.

References Cited by the Examiner

UNITED STATES PATENTS 3,089,821  5/63  Folkers _____ 167—78

OTHER REFERENCES

Haskins et al.: J. Exptl. Med., vol. 114, pp. 665–684, 1961.

Kabat and Mayer: Experimental Immunochemistry, Charles C. Thomas Publisher, Sec. Ed,. May 1961, pp. 830–836.

Strain: Chromatographic Adsorption Analysis, Interscience Publisher, Inc., N.Y., 1942, p. 87.

Westphal et al.: Angew. Chem., vol. 66, No. 13–14, pp. 407–417, 1954.

Westphal: Chem. Abst., vol. 47, p. 4415, 1957.

Westphal: Chem. Abst., vol. 53, p. 8269, 1959.

JULIAN S. LEVITT, *Primary Examiner.*